July 3, 1928.

A. D. SKINNER 1,675,388

METHOD OF AND APPARATUS FOR CONTROLLING POWER DRIVEN VEHICLES

Filed Oct. 18, 1919     7 Sheets-Sheet 1

A. D. SKINNER 1,675,388

METHOD OF AND APPARATUS FOR CONTROLLING POWER DRIVEN VEHICLES

Filed Oct. 18, 1919

Patented July 3, 1928.

1,675,388

UNITED STATES PATENT OFFICE.

ALLAN D. SKINNER, OF ERIE, PENNSYLVANIA, ASSIGNOR TO SKINNER PATENT HOLDING COMPANY, OF ERIE, PENNSYLVANIA, A CORPORATION OF PENNSYLVANIA.

METHOD OF AND APPARATUS FOR CONTROLLING POWER-DRIVEN VEHICLES.

Application filed October 18, 1919. Serial No. 331,686.

It is desirable with engines having a varying load to adjust the engine to the changes in condition by varying the interval of steam admission or cut-off to the cylinder. While this method of control gives the greatest efficiency so far as economy is concerned it is not adapted particularly in high power engines to satisfy the requirements with the starting of the engine. This is particularly true of engines used under automobile conditions. With such engines it is desirable to control the admission of steam at the starting of the engine with the throttling device so that the steam may be admitted to the cylinder through a longer period or with a later cut-off. If, therefore, the engine is started with a throttle control and then continued with a cut-off control both efficiency and flexibility are obtained and the present invention is designed to assure such operation. With engines having a fixed compression and particularly engines of the una-flow type with a central exhaust there is an added necessity for this method of control in that the cut-off is too early with a low speed of the engine or a low pressure to the engine cylinder the compression may exceed the pressure of the admitted steam so as to block the engine. With a control which assures a late cut-off with a slow running of the engine or with the starting of the engine such blocking is prevented.

In the present invention these two methods of control are so combined as to compel the operator to control the engine through the normal running of the engine by means of the cut-off, thus getting the greatest possible economy under the load conditions and at the same time permits of a throttle control in connection with the cut-off for that period, or speed of the engine, which requires a late cut-off.

In carrying out this invention it is preferably accomplished by utilizing the speed of the vehicle as a factor in the control in the initial movement of the vehicle and then to compel the use of the cut-off independently of the speed as a factor of control in the normal running of the engine.

I prefer also to accomplish this control wholly with one instrumentality, or operating lever, so that the ordinary operator will not be confused and this one lever preferably controls the reverse as well as the forward movement of the engine.

The apparatus exemplifying the invention and with which the method may be employed is illustrated in the accompanying drawings as follows:—

Figure 6:
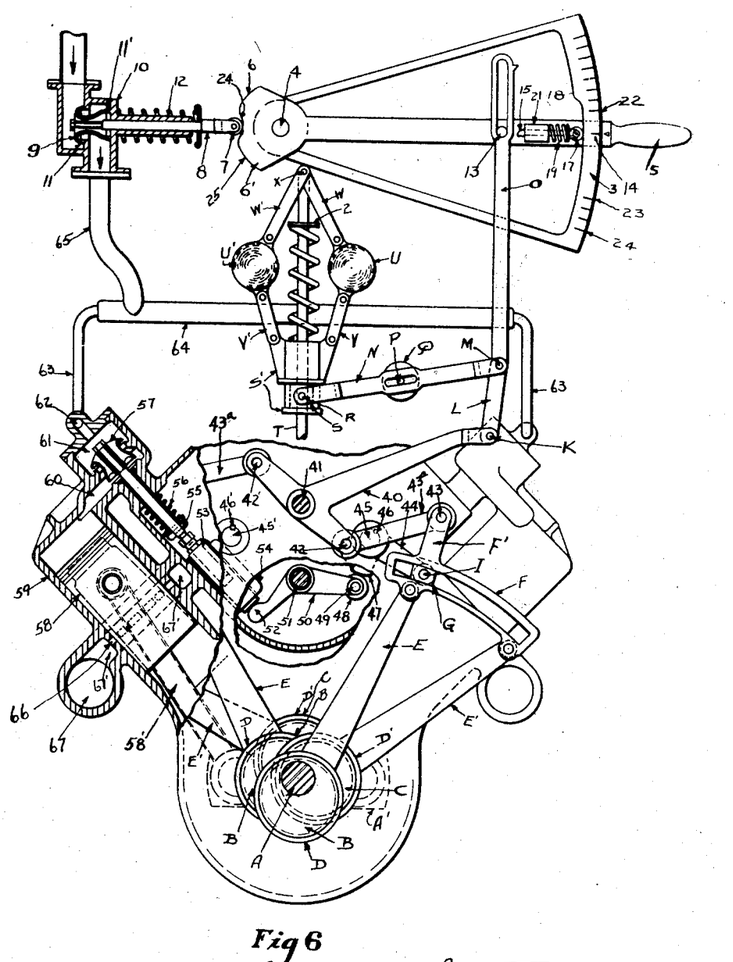
Fig. 6 shows an end view of an engine with the controlling mechanism as shown in Figs. 1 to 4, the arrangement of the devices being slightly altered in this figure for convenience in drawing and adaption to the particular construction.
Figures 7, 8:
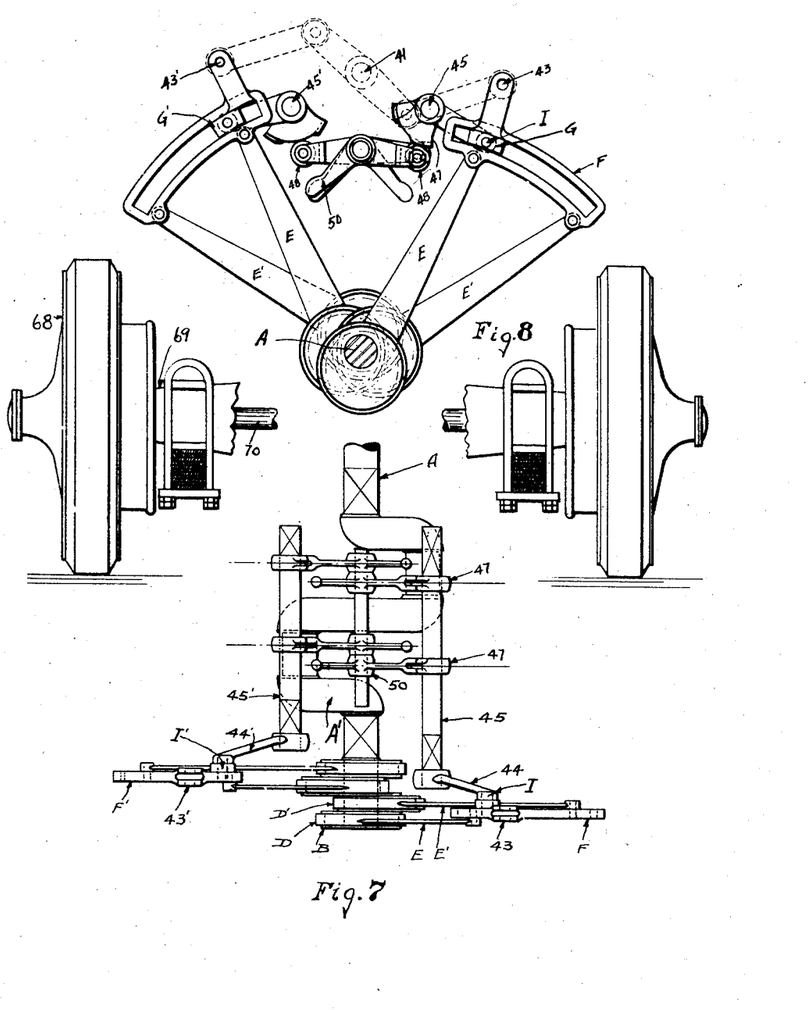
Fig. 7 is a plan view of the valve operating gear.
Fig. 8 a rear view of said gear and the vehicle, parts being broken away to better show construction.

A marks the engine crank shaft. The forward eccentric B and the reverse eccentric C are preferably mounted on this shaft. In the engine as shown in Figs. 6, 7, and 8 there are two sets of these eccentrics, the engine as shown comprising two pairs of single-acting units. The eccentrics B and C have straps D D' and the eccentric rods E E' respectively. These transmit motion to the link F. As shown the ordinary Stephenson link is used for varying the cut-off and direction of rotation of the engine but it will be understood that any known valve gear may be used.

G is a sliding block in the link F and is connected to the valve operating rocker 44 by a pin I. It will be understood that by varying the position of the curved link F on the block G a variable reciprocating motion is transmitted to the valve operating rocker 44 and a variable cut-off on the valves of the engine is thus attained, also the direction of the engine's rotation can be changed in the ordinary manner.

The link F is pivoted at K to the link rod L which is pivoted at its opposite end M to the shaft lever N and to the slotted control rod O. The lever N is slidingly mounted on a pin P. The pin P is mounted on a bracket Q and this is attached to some fixed part of the engine. The opposite end of the lever N is preferably of fork construction and is pivoted at R on the collar S. The collar S is rotatively mounted on the sleeve S' between the shoulders 28 and 29. It will readily be seen, therefore, that the collar S permits the rotation of the sleeve and as the sleeve moves axially it carries with it the lever N. The sleeve is slidingly mounted on the shaft T and is connected with the centrifugal weights U U' by means of links V V'. Links W W' extend from the weights to a pin X arranged at the upper end of the shaft T. The centrifugal weights are opposed by a centripetal element which as shown is in the form of a spring 1 which extends from the sleeve S' to a shoulder 2 fixed on the shaft. The shaft preferably extends downwardly through bearings T' and is provided at its lower end with a bevelled gear Z' which engages a bevelled gear Z. The bevelled gear Z may be driven by an extension Y on the crank shaft, the extension being carried in a bearing T² in the frame T³, the frame being mounted on a convenient part of the engine.

Figure 1:
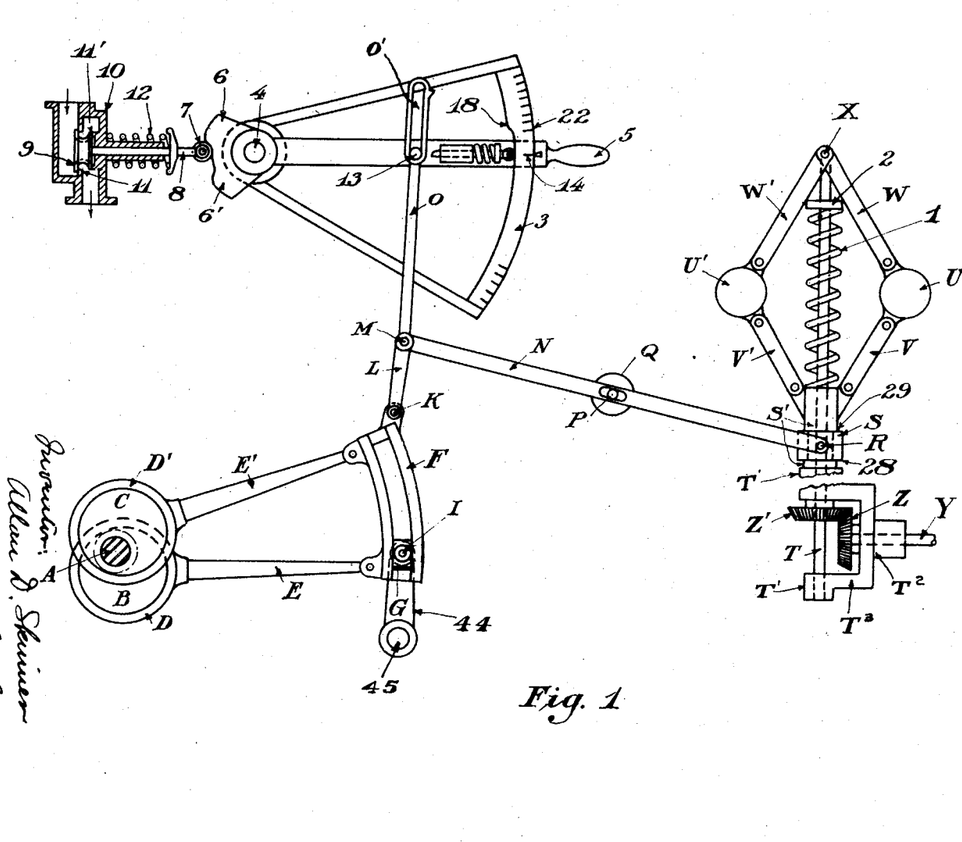
Fig. 1 shows the controlling mechanism including the throttle, operating lever, valve actuating mechanism and automatic cut-off adjusting devices. As shown in this Figure the parts are in neutral.
Figure 2:
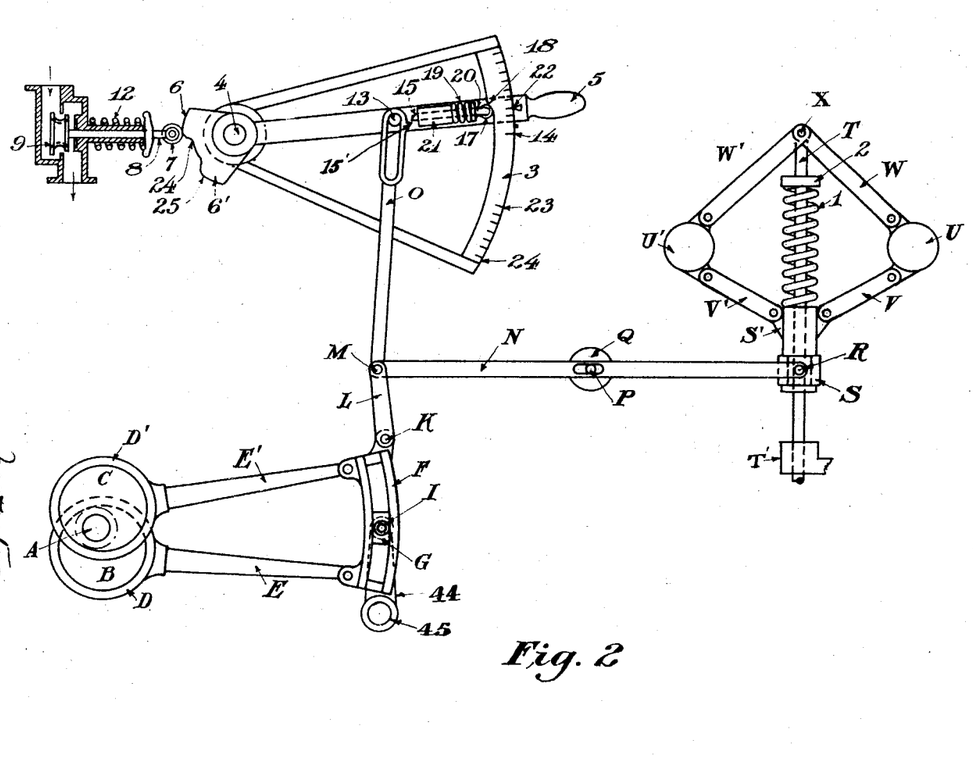
Fig. 2 is a similar view in which the operating lever has been moved in a forward position sufficiently to open the throttle and in which the automatic controlling devices for shifting the cut-off have operated the cut-off to bring the cut-off mechanism to an early cut-off position.
Figure 3:
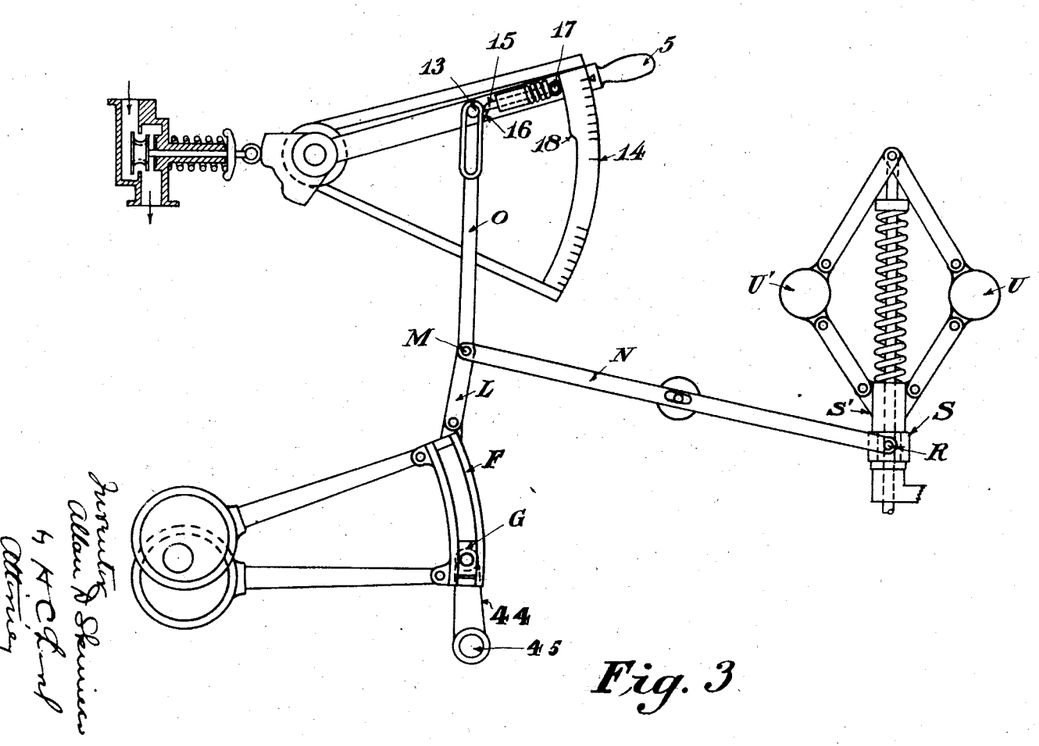
Fig. 3 shows the controlling lever thrown to give a full cut-off under normal running conditions.
Figure 4:
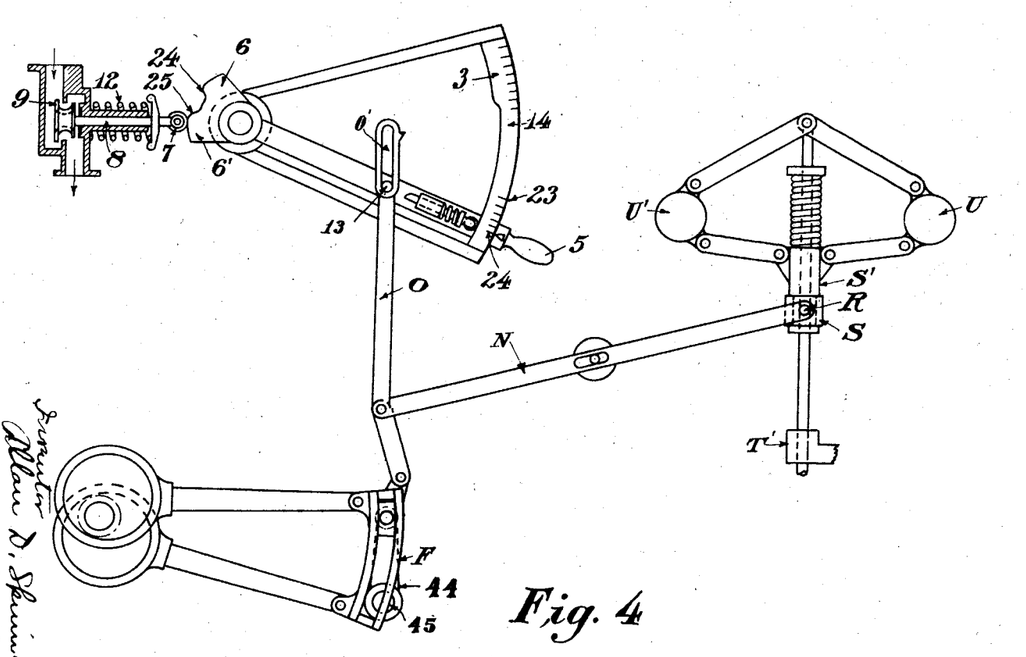
Fig. 4 shows a similar view in which the controlling lever is thrown to the reverse position.

The centrifugal weights are rotated by the shaft T as the engine is driven and their force, of course, is proportional to the speed of the engine. As the engine speeds up, acting under the impulse of centrifugal force the weights move outwardly, this outward movement being resisted by the spring 1 so that the position of the weights at any speed is the balanced position between the centripetal element formed by the spring as opposed to the position of the weights at the speed then attained. This outward movement of the weights rocks the lever N and as the lever N is rocked the link F is carried downwardly, thus moving the link F from a late cut-off position shown in Fig. 1 to the early cut-off position shown in Fig. 2.

The slot O' in the controlling rod O operates over a pin 13 on the operating lever 5. The operating lever is pivotally mounted on the shaft 4 and operates over the segment 3. Cams 6 6' are fixed on the shaft 4 and rock with the lever 5. The cams operate against a roller 7 carried by the stem 8 of the throttle valve 9. The throttle valve is arranged in a valve casing 10 and is provided with the seats 11 11' in the usual manner. The valve is closed by a spring 12 and the movement of the stem 8 through the action of the cam is resisted by the spring 12 so that the valve roller 7 is maintained in contact with the cam surfaces. With the structure so far as described the operation of the device may be understood. The link F is in position to give a late cut-off so that with the valve gear so arranged steam follows the piston a sufficient distance to overcome any compression there may be in the companion cylinder and load on the engine or the reverse end of the cylinder if a double-acting cylinder is used. Further where multiple sets of cylinders are used there is a greater overlap with the resultant advantages therefrom. The initial forward movement of the lever 5, therefore, so as to throw the cam 6 against the roller 7 opens the throttle valve 9. This may be opened as gradually as may be desired. Ordinarily with a vehicle the opening will be gradual giving the vehicle a gradual start. This is particularly desirable where high pressure steam is used with a high power engine because with the wide open cut-off necessary for slow starting for this type of engine an immediate full opening of the throttle would give the parts of the engine an unnecessary strain.

Immediately the motor starts the shaft T is put in motion, thus rotating the weights U U' and as the movement picks up the force of the weights overcomes the spring 1 and the outward movement of the weights carries the sleeve S' upwardly, thus rocking the lever N and swinging the link F downwardly so as to bring the link to a position on the block G to give an early cut-off. The element of speed in this control is such that by the time the early cut-off is reached the vehicle and engine have sufficient speed so that this early cut-off is not objectionable but on the contrary is a very desirable condition at this point. When it reaches this condition, therefore, a point which is called for convenience the minimum pre-determined speed, the throttle is full open but it has reached the point of early cut-off through the shifting device in which speed is a factor. With the parts in this position it will be noted the slot O' has traversed the pin 13 and that the pin is in contact with the upper end of the slot. A further movement of the operating lever 5, therefore, results in a direct movement of the link F thus increasing the cut-off and the normal speed of the vehicle is, therefore, controlled entirely through the cut-off and not the throttle. An operator wishing a desired speed, therefore, is compelled to give to the engine as early a cut-off as will supply the power necessary for this speed. The greatest possible efficiency, therefore, is attained.

It is desirable to positively lock the operating rod O with the lever 5 during that part of its travel in which it is in direct control of the link. To accomplish this I provide the latch 15 which is adapted to overlap a latch 15' on the lever O so as to lock the lever O with the lever 5. This latch as shown is mounted in a housing 21 on the lever 5 and has a roller 17 on its end which operates on a cam 18 on the segment 3 to move the latch into locking position. A spring 19 operates against a shoulder 20 on the latch 15 and normally holds the roller 17 in engagement with the surface of the segment and in the neutral position the position of the latch is such as to permit a free movement of the catch 15' on the lock past the latch. When, however, the lever is moved past the cam, that is to ordinary running positions, the latch 15 is moved inwardly by the cam 18 so as to overlap the catch 15' and thus the operating rod O is positively locked with the lever 5.

When it is desired to reverse the engine the lever 5 is moved downwardly along the segment. The initial movement of the lever throws the link downwardly a sufficient distance to give a long cut-off to the valve before the throttle is opened. At this point the cam 6' engages the roller 7 and as the lever progresses, opens the throttle valve. It will be noted that when the parts reach this position the lever N has been so moved as to remove the sleeve S' sufficiently to throw the controlling device entirely out of action. A direct reverse control, therefore, is accomplished entirely through the throttle and this is desirable because the throttle gives a very sensitive control and economy in the slight use of the vehicle in reverse is second in consideration.

The segment may be provided with graduations 22 and 23 to indicate the point of cut-off when running in the forward direction or the throttle when running in the reverse direction.

Figure 5:
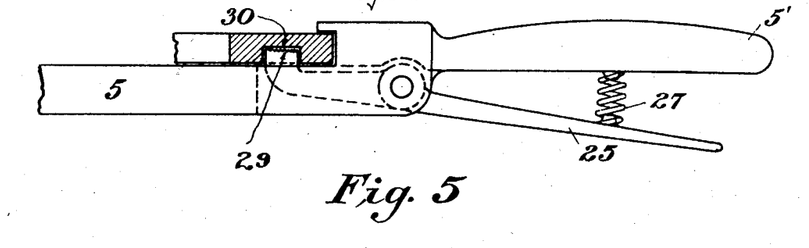
Figs. 5, 5ª and 5ᵇ show sections of the controlling lever segment and a part of the controlling lever with means for locking the controlling lever on the segment.
Figure 5A:
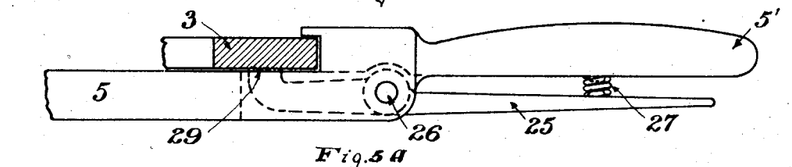
Figure 5B:
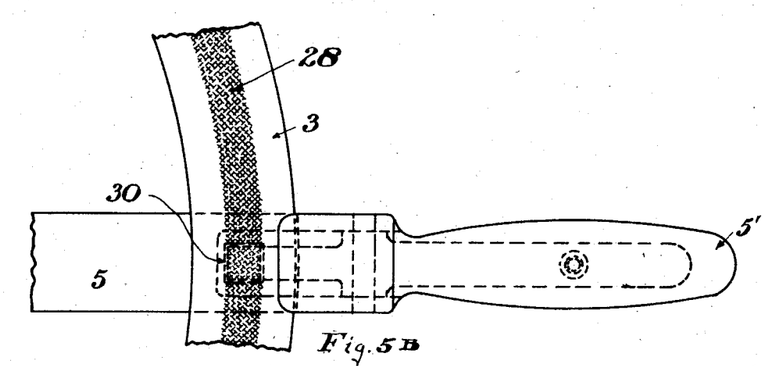

It is desirable to have the mechanism such that the operating lever 5 may be adjusted to any position and locked in that position. This may be accomplished by the mechanism shown in detail in Figs. 5, 5ª and 5ᵇ. In this the segment is provided with a serrated surface 28. the lever 5 is provided with a latch 25 the end of which operates over the surface 28. A spring 27 operates between the lever 5 and latch and yieldingly holds the end of the latch in engagment with the segment. The end of the latch has a serrated surface 29 which adapts it to engage and lock with the serrated surface 28. By means of this the operating lever may be locked in practically any position desired on the segment so that any running position may be maintained without the continued attention of the operator. I prefer to provide the segment with a detent opening 30 at the neutral point into which the end of the latch 25 drops so that the operating lever may be locked positively at this point.

In Figs. 6 and 7 I have shown this controlling apparatus installed in a vehicle utilizing a motor made up of two pairs of single-acting una-flow cylinders. Two sets of single-acting una-flow cylinders 59 are arranged at ninety degrees. These cylinders are provided with the pistons 58 which operating through the connecting rods 58' deliver power through the cranks A' to the crank shaft. The cylinders are provided with the exhaust ports 66 which discharge into the annular passage 67', the annular passage leading to the exhaust manifold 67. Steam is admitted to the cylinders through the port 60 and the port is connected with the steam chest 61. The steam chest is connected through the passage 62 with the steam pipe 63 leading through the throttle valve heretofore described to the boiler (not shown). The passage between the steam chest and the port 60 is controlled by the poppet valve 57. This may be of any desirable type and forms no part of this invention. The poppet valve is actuated by a stem 55 and is held to its seat by a spring 56. The stem 55 is actuated through a push rod 53 and the push rod is actuated by a rock lever 52. The rock lever 52 is mounted on the shaft 51. A rock arm 50 extends from the shaft 51. A roller 48 is mounted on a pin 49 at the end of the rock arm or lever 50. A cam 47 operates on the roller 48 and thus actuates the rock lever which in turn operates the valves 57. The cam 47 is mounted on a rock shaft 45 and is locked thereon by means of a key 46. The rock arm 44 heretofore described is fixed on the shaft 45. The block G is mounted on the rock arm 44. It will be readily observed that the throw of the cam is controlled by the link F in the usual manner. It will be understood that these mechanisms are in duplicate, one operating on each set of the cylinders and in order to rock the links F at each side I provide the intermediate lever 40 which is connected to the link L by means of the pin K instead of having the link L connected directly to the link F as shown in Figs. 1 to 4. Links 43ª are connected with arms on the lever 40 by means of pins 42 42' and extend to pins 43 arranged on projections F' on the links F. It will be readily seen that the interposed lever 40 simply compels a uniform rocking of the links F so as to make them operative for both sets of cylinders. The method of control and the action heretofore described actually control.

In Fig. 8 the crank shaft A will be seen in section. Vehicle wheels 68 mounted on the axle 69 are driven through the shaft 70. The crank shaft should be connected through the usual propeller shaft and the usual differential (not shown), with the drive shaft 70. These may be of any known type.

It will be observed, therefore, that with this mechanism there is an initial movement of the vehicle through a control in which speed is a factor and that in this initial control the throttle is utilized and the engine starts with a full cut-off which is shortened as the speed of the vehicle increases so as to make such shortening of the cut-off practical and desirable. As soon as the normal, or predetermined minimum speed is reached the throttle is wide open. The valve gear is automatically set at short cut-off. From here on the operator is compelled to control the vehicle through the cut-off, thus attaining greatest efficiency and at the same time a flexible and simple control. This is all accomplished with a single lever so that no confusion can arise in the operation. At the same time a cut-off is necessarily attained which at the speed desired is the most efficient.

What I claim as new is:—

1. In a pressure fluid actuated engine, the combination of a valve mechanism; a throttle for the engine; and speed controlled and directly manually operable cut-off mechanism automatically actuating the cut-off shortening the same from an initial long cut-off as the speed of the engine increases with initial acceleration whereby the engine may be started at long cut-off and the cut-off automatically shortened as the speed increases and the engine controlled during its normal running through the direct manual operation of the cut-off mechanism.

2. The method of controlling a fluid-actuated motor having a fixed compression which consists in starting the motor through a throttle and with an initial long cut-off; shortening the cut-off automatically with speed as a factor as the speed increases up to a pre-determined speed; and then varying the cut-off independently of the speed to control the speed of the motor.

3. The method of controlling a fluid-actuated motor having a fixed compression which consists in starting the motor through a throttle and with an initial long cut-off; shortening the cut-off automatically with speed as a factor as the speed increases up to a pre-determined speed; and then varying the cut-off by direct manual control of the cut-off to vary the speed of the motor.

4. The method of controlling a unaflow engine which consists in starting the motor with a long cut-off as the actuating fluid is admitted; shortening the cut-off automatically with speed as a factor as the speed increases to a pre-determined speed; and then varying the cut-off independently of the speed to continue the control of the motor.

5. The method of controlling a unaflow engine which consists in starting the motor with a long cut-off as the actuating fluid is admitted; shortening the cut-off automatically with speed as a factor as the speed increases to a pre-determined speed; and then varying the cut-off by direct manual control of the cut-off to continue the control of the motor.

6. The method of controlling a fluid pressure engine having a fixed compression comprising the starting of the engine with a long cut-off as steam is admitted; automatically shortening the cut-off with speed as a factor to a pre-determined speed; and then continuing the control with the cut-off independently of the speed.

7. The method of controlling a fluid pressure engine having a fixed compression comprising the starting of the engine with a long cut-off as steam is admitted; automatically shortening the cut-off with speed as a factor to a pre-determined speed; and then continuing the control with the cut-off, independently of the speed, without varying the steam admission other than by the cut-off.

8. In a vehicle, the combination of a driving means comprising an engine; a throttle for the engine; a variable cut-off mechanism for the engine; and a controlling device acting on the throttle and cut-off mechanism opening the throttle and compelling a control of the vehicle during normal running conditions through the cut-off mechanism independently of the throttle.

9. In a vehicle, the combination of a driving means comprising an engine; a throttle for the engine; a variable cut-off mechanism; and a controlling device acting on the throttle and cut-off mechanism actuating the throttle initially with the starting of the vehicle and opening the throttle and compelling a control of the vehicle during normal running conditions through the cut-off mechanism independently of the throttle.

10. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the direct manual control of the cut-off mechanism.

11. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the cut-off mechanism independently of the speed.

12. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the cut-off mechanism independently of the throttle and speed.

13. In a vehicle, the combination of a driving means comprising an engine; a throttle for the engine; a variable cut-off mechanism for the engine; and a controlling device acting on the throttle and cut-off mechanism opening the throttle and compelling a control of the vehicle during normal running conditions through the direct manual control of the cut-off mechanism, said device being adapted to give a full range of cut-off independently of the throttle.

14. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the direct manual control of the cut-off mechanism and being adapted to give a full range of cut-off.

15. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the direct manual control of the cut-off mechanism and being adapted to give a full range of cut-off and with a wide open throttle.

16. In a vehicle, the combination of a driving means comprising an engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the cut-off mechanism and being adapted to give a full range of cut-off with a wide open throttle.

17. In a vehicle, the combination of a driving means comprising an engine; a throttle for the engine; a variable cut-off mechanism for the engine; and a controlling device acting on the throttle and cut-off mechanism opening the throttle and compelling a control of the vehicle during normal running conditions through the cut-off mechanism independently of the throttle, said device being adapted to give a full range of cut-off with a wide open throttle.

18. In a vehicle, the combination of a driving means comprising an engine having a fixed compression; a throttle for the engine; a variable cut-off mechanism for the engine; and a controlling device acting on the throttle and cut-off mechanism opening the throttle and compelling a control of the vehicle during normal running conditions through the cut-off mechanism independently of the throttle.

19. In a vehicle, the combination of a driving means comprising an engine having a fixed compression; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the cut-off mechanism independently of the throttle.

20. In a vehicle, the combination of a driving means comprising a unaflow engine; a throttle for the engine; a variable cut-off mechanism for the engine; and a controlling device acting on the throttle and cut-off mechanism opening the throttle and compelling a control of the vehicle during normal running conditions through the cut-off mechanism independently of the throttle.

21. In a vehicle, the combination of a driving means comprising a unaflow engine; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the vehicle during normal running conditions through the cut-off mechanism independently of the throttle.

22. In an engine, the combination of a valve mechanism giving to the engine a fixed compression; a throttle for the engine; a variable cut-off mechanism controlling the valve acting on the engine; and a controlling device for the throttle and cut-off mechanism opening the throttle and compelling a control of the engine during normal running conditions through the cut-off mechanism independent of the throttle.

23. In an engine, the combination of a valve mechanism giving to the engine a fixed compression; a throttle for the engine; a variable cut-off mechanism controlling the valve for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the engine during normal running conditions through the cut-off mechanism independently of the throttle.

24. In a unaflow engine having fixed exhaust ports, the combination of a valve mechanism giving a fixed compression; a throttle for the engine; a variable cut-off mechanism acting on the engine; and a controlling device for the throttle and cut-off mechanism opening the throttle and compelling the control of the engine during normal running conditions through the cut-off mechanism independently of the throttle.

25. In a unaflow engine having fixed exhaust ports, the combination of a valve mechanism giving a fixed compression; a throttle for the engine; a variable cut-off mechanism for the engine; and a controlling device acting on the throttle and cut-off mechanism, said device comprising automatic means sensitive to the speed of the engine automatically controlling the cut-off to start with a long cut-off and to shorten the same as the speed increases, said device opening the throttle and compelling a control of the engine during normal running conditions through the cut-off mechanism independently of the throttle.

26. The combination of an engine throttle valve, manually actuated means to operate the same, a speed controlled cut-off mechanism, and a connection between said means and said mechanism adapted to vary the action of the latter.

27. The combination of an engine throttle valve, manually actuated means to operate the same, a speed controlled cut-off mechanism, and means actuated by said valve-operating means to vary the action of said cut-off mechanism.

28. The combination of an engine throttling machanism, a speed controlled cut-off mechanism, and means actuated by the manual operation of said throttling mechanism to vary the action of said cut-off mechanism when the throttle is opened to a predetermined extent.

29. The combination of an engine throttling mechanism, a speed controlled cut-off mechanism, and means actuated by the manual operation of said throttling mechanism to suspend the action of the speed control of the said cut-off mechanism when the throttle is opened to a predetermined extent.

30. The combination of an engine throttle valve, a lever to operate the same, a speed controlled cut-off mechanism, and means actuated by said lever to prevent the operation of said mechanism when the lever is moved to a predetermined extent.

31. The combination of an engine throttle valve, a manually actuated lever to operate the same, a speed controlled cut-off mechanism, and means actuated by said lever to prevent the operation of said mechanism when the lever is moved to a predetermined extent, said means including a lost motion device permitting initial movement of the lever without varying such operation.

32. The combination of an engine throttle valve, a manually actuated lever to operate the same, a speed controlled cut-off mechanism, and means actuated by said lever to prevent the operation of said mechanism when the lever is moved to a predetermined extent, said means including a lost motion device permitting initial movement of the lever without varying such operation and a latch engageable between the lever and said device, to prevent such lost motion, when the lever is in certain position.

33. The combination of an engine throttle valve, a speed controlled cut-off mechanism, means to vary the operation of said cut-off mechanism, and a single manually actuated operating device connected to and controlling said valve and said means.

34. The combination of an engine throttle valve, a lever controlling the same, a speed-controlled cut-off mechanism including a shiftable member comprising devices responsive to speed, and a connection between said lever and said member, permitting movement of the latter by the former.

35. The combination of an engine throttle valve, a manually actuated movable device controlling the same, a speed controlled cut-off and reversing mechanism including a shiftable member, and a connection between said device and said member, for movement of the latter by the former.

36. The combination of an engine throttle valve, a manually actuated device movable initially to substantially fully open said valve, a speed-controlled cut-off mechanism normally active during said initial movement, and means actuated by additional movement of said device to vary the action of said cut-off mechanism.

37. The combination of an engine throttle valve, a manually actuated device movable initially to substantially fully open said valve, a speed controlled cut-off mechanism operating normally during such initial movement, and means actuated by additional movement of said device to progressively change the operation of said mechanism according to the extent of such additional movement.

38. The combination of an engine throttle valve, an operating device therefor, and a speed-controlled cut-off mechanism including a shiftable member having a lost motion connection with said device permitting speed-control of said member within the limits of said lost motion, said device being movable to shift said member in opposition to the tendency of the speed control.

39. The combination of an engine throttle valve, an operating device therefor, and a speed-controlled cut-off mechanism including a shiftable member having a lost motion connection with said device permitting speed-control of said member within the limits of said lost motion, said device being movable to shift said member in opposition to the tendency of the speed control and means to prevent said lost motion when said device is in certain positions.

40. The combination of a throttle valve for an engine, a speed controlled cut-off valve actuating mechanism for said engine, a manually actuated operating device for said throttle valve, and a connection between said device and said mechanism, said connection including means to permit normal operation of said cut-off mechanism during a certain range of movement of said device and to vary said normal operation by movement of said device beyond said range.

41. The combination of a throttle valve for a engine, a manually actuated operating lever for the valve, a speed controlled cut-off valve actuating and reversing mechanism, for said engine, said mechanism including a shifting link, and a connection between said link and said lever, adapted to permit shift of the former by the latter.

42. The combination of an engine throttling mechanism, a speed controlled mechanism thrown into action as the engine starts with the opening of the throttle, a cut-off mechanism automatically actuated by said speed-controlled mechanism and tending to reduce the speed to a predetermined minimum, and manually operative means to lengthen the cut-off, to increase the speed above said minimum.

43. In a fluid actuated engine, the combination of an engine throttle valve; an operating device therefor; a cut-off mechanism; means independent of said device for initially actuating the cut-off mechanism to move the same from a long cut-off to a short cut-off as the engine starts; and means connected with said devices operating on said cut-off directly for the normal control of said cut-off mechanism.

In testimony whereof I have hereunto set my hand.

ALLAN D. SKINNER.